United States Patent [19]

Spencer

[11] 4,354,118

[45] Oct. 12, 1982

[54] BATTERY BACKUP SUPPLY CONTROL MEANS AND METHOD

[75] Inventor: William H. Spencer, Monrovia, Calif.

[73] Assignee: Bell & Howell Company, Chicago, Ill.

[21] Appl. No.: 230,265

[22] Filed: Jan. 30, 1981

[51] Int. Cl.³ .............................................. H02J 9/00
[52] U.S. Cl. ........................................ 307/66; 320/13; 320/40
[58] Field of Search ............... 307/66, 64, 87; 320/13, 320/29, 40, 30, 33

[56] References Cited

U.S. PATENT DOCUMENTS 3,573,483 4/1971 White ..................................... 307/66

Primary Examiner—G. Z. Rubinson
Assistant Examiner—James L. Dwyer
Attorney, Agent, or Firm—Charles P. Sammut

[57] ABSTRACT

An apparatus for automatically connecting and disconnecting a battery backup supply senses when the potential of a main d.c. power supply drops below a first predetermined value, and in response thereto connects the battery backup supply to an electrical load. The apparatus also senses when the potential of the battery backup supply drops below a second predetermined value and in response thereto disconnects the battery backup supply from the electrical load.

23 Claims, 1 Drawing Figure

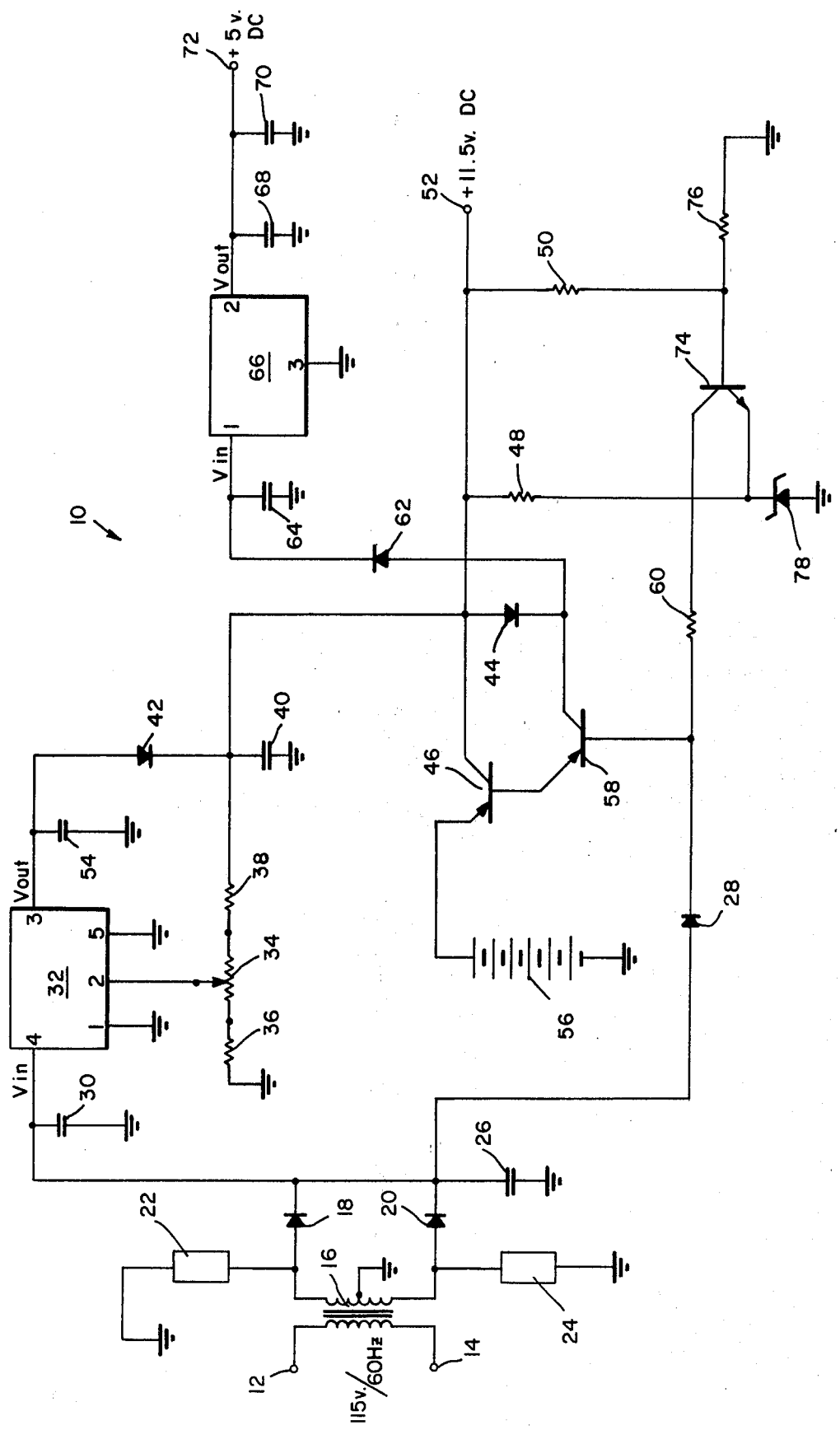

BATTERY BACKUP SUPPLY CONTROL MEANS AND METHOD

BACKGROUND OF THE INVENTION

1. Field of the Invention

This invention relates to electronic circuits for automatically connecting and disconnecting a battery backup supply.

2. Description of the Prior Art

In the course of acquiring, processing and displaying information a variety of solid state memory devices may be utilized. Some types of these solid state memory devices, such as a random access memory (RAM) require a continuous supply of power thereto in order to prevent a loss of stored information. Consequently, an interruption in power to a RAM will destroy the stored information.

Various methods have been used to solve this problem. One approach has been to power the memory device directly from a storage cell such as a lead-acid battery or a nickel-cadmium battery. The main disadvantage of this approach is the constant requirement for recharging and/or replacing the battery.

A method which avoids the above problem utilizes a sensing circuit which connects the battery to the memory device only upon the loss of power from the regulated power supply. This method, however, has the disadvantage permitting the battery to completely discharge if the regulated power supply does not become operative within a certain period of time. This certain period of time is dependent upon the capacity of the battery (commonly expressed in units of ampere-hours) and the current drawn by the circuit connected to the battery. The disadvantage of this method is that even though the memory device will lose its stored information when the voltage of the battery drops below a certain level, the battery continues to discharge. With many types of batteries, such as lead-acid types and nickel-cadmium types, the cell cannot be recharged if it has been completely discharged repeatedly.

Accordingly, it is desireable to provide a method and apparatus for automatically connecting a battery backup supply upon the failure of a main d.c. power supply, in addition to preventing a complete discharge of the battery backup supply.

BRIEF DESCRIPTION OF THE DRAWING

The sole FIGURE is a detailed schematic diagram of the preferred embodiment of the invention.

SUMMARY OF THE INVENTION

This invention is directed toward a method and apparatus for automatically connecting a battery backup supply upon the failure of a main d.c. power supply for automatically disconnecting the battery backup supply after the potential of the battery backup supply has dropped below a useful value.

In general, this is accomplished by sensing the potential of the main d.c. power supply and the potential of the battery. When the potential of the main d.c. power supply drops below a first predetermined level, a germanium transistor is switched on, thereby connecting the battery to a load. When the voltage of the battery drops below a second predetermined level, the germanium transistor is switched off thereby disconnecting the battery from the load. In the event that the germanium transistor has been switched on, and the battery voltage is above the second predetermined level, if the main d.c. power supply rises above the first predetermined level, the germanium transistor is switched off thereby disconnecting the battery from the load.

Many additional features and advantages of the invention, including the adaptability of the subject apparatus to other electronic equipment will be apparent from a reading of the specification in which an illustrative embodiment of the invention is described in detail. This specification is to be taken with the accompanying drawing in which the various electronic characteristics of the preferred embodiment are illustrated.

DESCRIPTION OF THE PREFERRED EMBODIMENT

Referring to the sole FIGURE, a d.c. power supply incorporating circuitry for enabling and disabling a backup battery supply is shown generally at 10. A pair of input terminals 12 and 14 connect the primary winding of the transformer 16 to an external 115 volt, 60 Hertz power source (not shown). The secondary winding of the transformer 16 has its center-tap grounded to form to full-wave rectifier circuit with a pair of diodes 18 and 20. A transient suppressor 22 is connected between ground and the junction of the anode of the diode 18 and a first end of the secondary winding of the transformer 16. A transient suppressor 24 is connected between ground and at the junction of anode of the diode 20 and a second end at the secondary winding of the transformer 16.

An electrolytic capacitor 26 is connected between ground and the junction of the cathodes of the diodes 18 and 20, the anode at a diode 28, a first end of a capacitor 30, and terminal 4 of a voltage regulator 32. The negative terminal of the capacitor 30 is connected to ground. The regulator 32 is a LAS-14AU which is manufactured by Lambda. Terminals 1 and 5 of the regulator 32 are both grounded. Terminal 2 of the regulator 32 is connected to the center arm of a potentiometer 34. The potentiometer 34 has a first end connected to a first end of a resistor 36 and a second end connected to a first end of a resistor 38. A second end of the resistor 36 is connected to ground. A second end of the resistor 38 is connected to the junction of the positive terminal of an electrolytic capacitor 40, the cathode of a diode 42, the anode of a diode 44, the collector of a transistor 46, a pair of resistors 48 and 50 and a power output terminal 52. The negative terminal the electrolytic capacitor 40 is grounded.

Terminal 3 of the regulator 32 is connected to the junction of the first end of capacitor 54 and the anode of the diode 42. The second end of the capacitor 54 is grounded. A battery 56 has its cathode connected to ground and its anode connected to the emitter of the transistor 46. The base of the transistor 46 is connected to the emitter of a transistor 58. The base of the transistor 58 is connected to the junction of the cathode of the diode 28 and a first end of a resistor 60. The collector of the transistor 58 is connected to the junction of the cathode of the diode 44 and the anode of a diode 62. The cathode of the diode 62 is connected to the junction of a first end of a capacitor 64 and terminal 1 of a voltage regulator 66. The regulator 66 is a LAS-1405 which is manufactured by Lambda. Terminal 3 of the regulator 66 is connected to ground. Terminal 2 of the regulator 66 is connected to the junction of a first end of a capacitor 68, the positive terminal of an electrolytic capacitor 70 and a power output terminal 72. The second end of each of the capacitors 64 and 68 is grounded. The negative terminal of the electrolytic capacitor 70 is also grounded.

The base of a transistor 74 is connected to the junction of the resistor 50 and a first end resistor 76. The second end of the resistor 76 is grounded. A zener diode 78 has its anode connected to ground and its cathode connected to the junction of the resistor 48 and the emitter of the transistor 74. The collector of the transistor 74 is connected to a second end of the resistor 60.

OPERATION

With the battery 56 connected as shown in the drawing, before any power has been applied to the terminals 12 and 14 the transistors 46, 58 and 74 are in a non-conducting state. Therefore, except for internal resistance of the battery 56, the current drain on the battery 56 is essentially zero. When power is applied to the terminals 12 and 14, the diodes 18 and 20 conduct on alternate half cycles of the voltage across the secondary winding of the transformer 16. The surge suppressors 22 and 24 provide protection against transients appearing at their respective junctions. The capacitor 26 filters the rectified current, and this rectified current is fed into the input terminal, terminal 4, of the voltage regulator 32. In the preferred embodiment of the invention the transformer 16 and the capacitor 26 are chosen such that the no-load potential at the terminal 4 of the voltage regulator 32 is +24.0 volts d.c. and the potential at this same terminal is +19.0 volts d.c. with a total load of 2.0 amperes at the terminals 72 and 52. The capacitors 30 and 54 operate as by-pass capacitors. The potentiometer 34 is operable to set the output voltage at terminal 3 of the voltage regulator 32. In the preferred embodiment of the invention, the potentiometer 34 is set such that the voltage at the terminal 52 is 11.5 volts d.c.. Power from the voltage regulator 32 is also applied to an input terminal, terminal 1, of the voltage regulator 66 through the diodes 44 and 62. The voltage regulator 66 is internally set to provide an output potential of +5.0 volts d.c. at both its output terminal, terminal 2 and at the output terminal 72. The capacitors 64 and 68 operate as by-pass capacitors, while the electrolytic capacitor 70 operates as a filter capacitor. The diode 62 operates to provide an essentially constant voltage drop between the cathode of the diode 44 and terminal 1 of the voltage regulator 66.

With a potential of +11.5 volts d.c. at the terminal 52, current flows through the resistor 48 and the zener diode 78 to provide a potential of +5.0 volts at the emitter of the transistor 74. The resistors 50 and 76 operate as a voltage divider to forward bias the base-emitter junction of the transistor 74. Since the base-emitter junction of the transistor 74 is forward biased, current flows from the diodes 18 and 20, through the diode 28 and resistor 60 into the collector of the transistor 74.

As previously explained, when the circuit 10 is under a load of 2.0 amperes, the potential at the anode of the diode 28 is approximately +19.0 volts. Accounting for the voltage drop across the diode 28, the potential at the base of the transistor 58 is approximately +18.4 volts. With the potential of the battery 56 at +12.0 volts, the emitter-base junctions of the transistors 46 and 58 are reverse biased, thereby rendering both transistors non-conductive. Therefore essentially no current flows from the battery 56.

When power at the terminals 12 and 14 is interrupted, the resistance-capacitance circuit consisting of the capacitors 26 and 30 and the impedance at terminal 4 of the voltage regulator 32 decays to the point where the potential at the base of the transistor 58 is approximately +11.0 volts thereby allowing the emitter-base junctions of the transistors 46 and 58 to become forward biased. The value of the electrolytic capacitor 40 is selected such that during this decay interval the potential at the base of the transistor 74 remains sufficiently high to maintain the transistor 74 in a conductive state at least until the transistor 46 has switched into a conductive state.

With the transistors 46 and 58 in a conductive state, since the transistor 46 is a germanium type, the voltage drop across the base collector junction, under load, is approximately 0.25 volts. The use of a germanium type transistor for the transistor 46 extends the amount of time during which the battery 56 can supply power above the required potential. Since the transistor 46 is of a germanium type and the transistor 56 is of a silicon type, in order to keep the voltage drop across the emitter and collector of the transistor 46 to a minimum, to thereby keep the potential at the terminal 52 at a maximum, a silicon diode 44 functions to keep the potential at collector of the transistor 46 approximately 0.6 volts lower than the potential at the collector at the transistor 58.

Stated differently, the diode 44 functions to keep the transistor 46 operating as close as possible to its collector to emitter voltage saturation point, to thereby minimize the voltage drop from the emitter to the collector of the transistor 46.

As the battery 56 discharges, the transistor 74 is maintained in a conductive state since its base-emitter junction is forward biased by the voltage divider resistors 50 and 76. Since the resistor 48 and the zener diode 78 maintains the potential at the emitter of the transistor 74 at +5.0 volts, when the battery 56 discharges such that the potential of the base of the transistor 74 is less than approximately +5.6 volts, the transistor 74 becomes non-conductive, thereby opening the circuit from the resistor 60. As a consequence, the transistors 46 and 58 become non-conductive, thereby effectively preventing further discharge of the battery 56. When power is reapplied to the terminals 12 and 14 the transistors 46 and 58 remain in a non-conductive state since the emitter-base junctions of the transistors 46 and 58 again become reverse-biased through the diode 28.

A suitable charging circuit (not shown) may be utilized to recharge the battery 56 after the battery 56 has been partially discharged. One such charging circuit is disclosed at pages 36–37 in the publication entitled Battery Application Manual, published by Gates Energy Products, Inc., 1976, which publication is incorporated herein by reference. The output of such a charging circuit could be connected between ground and the junction of the anode of the battery 56 and the emitter of the transistor 46.

To assist the practitioner in constructing the preferred embodiment of the invention the following part values or identification numbers are listed. All resistors are ±2%, 0.25 watt nominal unless otherwise specified. All capacitors are ±10% unless otherwise specified.

| Reference Number | Type | Value or Identification Number |
|---|---|---|
| 16 | transformer | Stancor P-8669, 117 volt primary, 28 volt center-tapped secondary, 4 ampere rating |
| 18 | diode | IN3880 |
| 20 | diode | IN3880 |
| 22,24 | transient - suppressor | V33ZA1 |
| 26 | electrolytic - capacitor | 4000 mfd., +75%, −10%; 25 volts |
| 28 | diode | IN4002 |
| 30 | capacitor | 0.1 mfd. |
| 32 | voltage - regulator | LA5-14AU |
| 34 | potentiometer | 500 ohm, 0.75 watt |
| 36 | resistor | 680 ohm |
| 38 | resistor | 3300 ohm |
| 40 | electrolytic - capacitor | 10 mfd., +75%, −10%; 16 volt |
| 42 | diode | IN3880 |
| 44 | diode | IN3880 |
| 46 | germanium - transistor | 2N456A |
| 48 | resistor | 1000 ohm |
| 50 | resistor | 270 ohm |
| 54 | capacitor | 0.1 mfd. |
| 56 | battery | 12.0 volt, rechargeable |
| 58 | transistor | 2N2905 |
| 60 | resistor | 470 ohm |
| 62 | diode | IN3880 |
| 64 | capacitor | 0.1 mfd. |
| 66 | voltage - regulator | LAS-1405 |
| 68 | capacitor | 0.1 mfd. |
| 70 | electrolytic - capacitor | 10 mfd., +75%, −10%; 16 volt |

It is to be understood that the subject invention has been described by reference to specific embodiments and that many additions and modifications thereto will be apparent to those skilled in the art. Accordingly, the forgoing description is not to be construed in a limiting sense.

I claim:

1. An apparatus for automatically connecting and disconnecting a battery supply from an electrical load, the apparatus comprising:
    first means for connecting the battery supply to the electrical load when the potential of a power source drops below a first predetermined value; and
    second means for disconnecting the battery supply from the electrical load when the potential of the battery supply drops below a second predetermined value, including a first transistor having an emitter, base and collector, with the collector of the first transistor resistively connected to the first means, operative to provide a conductive path between the first means and ground potential when the base-emitter junction of the first transistor is forward biased and forward biasing means connected to the base of the first transistor, operative to forward bias the base-emitter junction of the first transistor until the potential of the battery supply drops below the second predetermined value.

2. The apparatus of claim 1 further comprising:
    potential reference means for establishing a substantially constant potential at the emitter of the first transistor.

3. The apparatus of claim 2 wherein the potential reference means further comprises:
    a zener diode.

4. The apparatus of claim 1 wherein the forward biasing means further comprises:
    a voltage divider connected to the electrical load operative to forward bias the base-emitter junction of the first transistor until the potential of the battery supply drops below the second predetermined value; and
    resistive capacitive decay means connected to the voltage divider, operative to forward bias the base-emitter junction of the first transistor during the period from when the potential of the power source drops below the first predetermined value until the battery supply is connected to the electrical load.

5. An apparatus for automatically connecting and disconnecting a battery supply from an electrical load, the apparatus comprising:
    a first transistor having an emitter, base and collector, with the emitter of the first transistor connected to the battery supply and the collector of the first transistor connected to the electrical load;
    a second transistor having an emitter, base and collector, with the emitter of the second transistor connected to the base of the first transistor, and the base of the second transistor connected to a power source, operative to reverse bias the base-emitter junctions of the first and second transistors until the potential of the power source drops below a first predetermined value; and
    a third transistor having an emitter, base and collector, with the collector of the third transistor being resistively connected to the base of the second transistor, the third transistor being operative to provide a conductive path between the base of the second transistor and ground when the potential of the battery supply is at least a second predetermined value.

6. The apparatus of claim 5 further comprising:
    voltage drop means connected between the collectors of the first and second transistors, operative to set the potential of the collector of the first transistor below the potential of the collector of the second transistor.

7. The apparatus of claim 6 wherein the voltage drop means further comprises:
    a diode.

8. The apparatus of claim 5, 6 or 7 further comprising:
    potential reference means for establishing a substantially constant potential at the emitter of the third transistor.

9. The apparatus of claim 8 wherein the potential reference means further comprises:
    a zener diode.

10. The apparatus of claim 5, 6 or 7 further comprising:
    a voltage divider connected to the electrical load, operative to forward bias the base-emitter junction of the third transistor until the potential of the battery supply drops below the second predetermined value; and
    resistive-capacitive decay means connected to the voltage divider, operative to forward bias the base-emitter junction of the third period from when the potential of the power source drops below the first predetermined value until the battery supply is connected to the electrical load.

11. A method of automatically connecting and disconnecting a battery supply from an electrical load, comprising the steps of:

sensing the potential of a power source;

connecting the battery supply to the electrical load by forward biasing the base-emitter junction of a first transistor when the potential power source drops below a first predetermined value;

sensing the potential of the battery supply; and disconnecting the battery supply from the electrical load by providing a current path from the base of the first transistor through the collector of a second transistor, dividing the potential at the electrical load, and applying the divided potential to the base of the second transistor to thereby render non-conductive the base-emitter junctions of the first and second transistors when the potential of the battery supply drops below a second predetermined value.

12. A method as claimed in claim 11 wherein sensing the potential of power source includes the steps of:

applying the potential of the power source through a diode to the base of the first transistor through the base-emitter junction of a third transistor.

13. A method of automatically connecting and disconnecting a battery supply from an electrical load, comprising the steps of:

sensing the potential of a power source;

connecting the battery supply to the electrical load by forwarding biasing the base-emitter junctions of a first and a second transistor when the potential of the power source drops below a first predetermined value; and disconnecting the battery supply from the electrical load by providing a current path from the base of the second transistor to the collector of a third transistor, dividing the potential at the electrical load, and applying the divided potential to the base of the third transistor to thereby render non-conductive the base-emitter junctions of the first, second and third transistors when the potential of the battery supply drops below a second predetermined value.

14. A method as claimed in claim 13 wherein sensing the potential of the power source includes the steps of:

applying the potential of the power source through a diode to the base of the second transistor.

15. A method of automatically connecting and disconnecting a battery supply from an electrical load, comprising the steps of:

reverse biasing the base-emitter junctions of a first transistor and a second transistor when the potential of a power source is at least a first predetermined value;

forward biasing the base-emitter junction of a third transistor to provide a conductive path from the base of the first transistor through the emitter-base junction of the second transistor to ground potential when the potential at the electrical load is at least a second predetermined value;

forward biasing the base-emitter junctions of both the first and the second transistors to thereby connect the battery supply through the first transistor to the electrical load when the potential of the power source drops below the first predetermined value; and biasing the base-emitter junction of the third transistor to render non-conductive the path from the base of the first transistor through the emitter-base junction of the second transistor to ground potential when the potential of the electrical load drops below the second predetermined value.

16. A method as claimed in claim 15 wherein the forward biasing of the base-emitter junction of the third transistor includes the steps of:

maintaining the base-emitter junction of the third transistor forward biased during the period from when the potential of the power source drops below the first predetermined value until the battery supply is connected to the electrical load by utilizing a resistive-capacitive decay means.

17. A method as claimed in claim 15 wherein the biasing of the base-emitter junction of the third transistor includes the steps of:

dividing the potential at the electrical load and applying the divided potential to the base of the second transistor.

18. A method as claimed in claims 15, 16 or 17 further comprising the steps of:

maintaining the collector of the first transistor at a higher potential than the collector of the second transistor.

19. A method as claimed in claims 15, 16 or 17 further comprising the steps of:

maintaining the emitter of the third transistor at a substantially constant potential.

20. The apparatus of claim 1 wherein the first means further comprises:

first semiconductor switch means connected in series with the battery supply and the load, operative to provide a conductive path between the battery supply and the load when the potential of the power source drops below the first predetermined value.

21. The apparatus of claim 20 wherein the first semiconductor switch means further comprises:

a germanium transistor.

22. The apparatus of claim 20 wherein the first semiconductor switch means further comprises:

a second transistor having an emitter, base and collector, with the emitter of the second transistor connected to the battery supply and the collector of the second transistor connected to the electrical load;

a third transistor having an emitter, base and collector, with the emitter of the third transistor connected to the base of the second transistor, and the base of the third transistor connected to the power source, operative to sense the potential of the power source; and voltage drop means connected between the collectors of the second and third transistors, operative to set the potential of the collector of the second transistor below the potential of the collector of the third transistor.

23. The apparatus of claim 22 wherein the voltage drop means further comprises:

a diode.

* * * * *

UNITED STATES PATENT AND TRADEMARK OFFICE
CERTIFICATE OF CORRECTION

PATENT NO. : 4,354,118
DATED : October 12, 1982
INVENTOR(S) : William H. Spencer It is certified that error appears in the above-identified patent and that said Letters Patent are hereby corrected as shown below:

Column 1, line 42, delete "desireable" and insert in place thereof --desirable--.

Column 2, line 1, after "if the" insert --potential of--;

Column 2, line 29, before "anode" insert --the--;

Column 2, line 34, delete "at" and insert in place thereof --of--;

Column 2, line 49, after "terminal" insert --of--.

Column 3, line 33, delete "by-pass" and insert in place thereof --bypass--;

Column 3, line 44, delete "by-pass" and insert in place thereof --bypass--.

Column 6, line 65, delete "period" and insert in place thereof --transistor--.

Column 8, line 22, delete "second" and insert in place thereof --third--.

Signed and Sealed this

Twenty-sixth Day of April 1983

[SEAL]

Attest:

GERALD J. MOSSINGHOFF

Attesting Officer

Commissioner of Patents and Trademarks